United States Patent [19]

Yamada et al.

[11] Patent Number: 5,002,913
[45] Date of Patent: Mar. 26, 1991

[54] DIELECTRIC CERAMICS FOR HIGH FREQUENCY

[75] Inventors: Akira Yamada; Susumu Kawamata; Hirosi Nakajo; Hisao Watarai, all of Amagasaki, Japan

[73] Assignee: Mitsubishi Denki Kabushiki Kaisha, Tokyo, Japan

[21] Appl. No.: 453,853

[22] Filed: Dec. 20, 1989

[30] Foreign Application Priority Data

Dec. 27, 1988 [JP] Japan ................................. 63-330446

[51] Int. Cl.$^5$ ............................................... G04B 35/46
[52] U.S. Cl. ......................................... 501/136; 501/135
[58] Field of Search ...................... 501/134, 135, 136; 423/598

[56] References Cited

U.S. PATENT DOCUMENTS

| 4,859,641 | 8/1989 | Fujino et al. | 501/136 |
| 4,900,702 | 2/1990 | Tsuboi et al. | 501/136 |

FOREIGN PATENT DOCUMENTS

| 3444982 | 6/1985 | Fed. Rep. of Germany | 501/136 |
| 61-198505 | 9/1986 | Japan . | |
| 3134558 | 6/1988 | Japan . | |

*Primary Examiner*—Karl Group
*Attorney, Agent, or Firm*—Oblon, Spivak, McClelland, Maier & Neustadt

[57]  ABSTRACT

A dielectric ceramics for high frequencies having its dielectric constant of as high as 80 and a sufficiently high Q value (1/dielectric loss) of 1,000 or above, even in a micro-wave region, which is a compound having a structure of $Sr_3Ti_2O_7$, and being represented by the following general formula: $Sr_{3(1-x)}Ca_{3x}Ti_2O_7$ (where: $0.1 < x \leq 0.55$).

2 Claims, No Drawings

DIELECTRIC CERAMICS FOR HIGH FREQUENCY

BACKGROUND OF THE INVENTION

1. Field of the Invention

This invention relates to dielectric ceramics for high frequencies, which indicates a particularly high dielectric constant and a high Q value at micro-wave frequencies.

2. Description of the Prior Art

The dielectric ceramics for high frequency have a wide range of applications in the fields of portable wireless apparatuses, satellite broadcasting, micro-wave integrated circuits, etc. Above all, these dielectric ceramics are used as the dielectric resonators for improving the filter characteristics and frequency stability. The following characteristics of the dielectric resonator are required when it is used in the microwave region: since the size of the dielectric resonator is inversely proportional to the square root of the dielectric constant, it should have ① a high dielectric constant for the reduction in size of the resonator; ② a low dielectric loss; and ③ an excellent temperature stability against resonant frequency.

As well known dielectric ceramics having such characteristics as mentioned above, there can be exemplified a compound as disclosed in, for example, Japanese Unexamined Patent Publication No. 198505/1986 to be represented by the following general formula: $aSrO \cdot bCaO \cdot cTiO_2 \cdot dSnO_2$ (where $0.39 \leq a \leq 0.70$, $0 \leq b \leq 0.28$, $0.27 \leq c \leq 0.35$, $0 \leq d \leq 0.04$, $a+b+c+d=1$), so forth.

However, in the dielectric ceramic materials for high frequencies, it is generally very difficult to attain both a high relative dielectric constant and a low dielectric loss. To be precise, the relative dielectric constant of the above-mentioned conventional dielectric ceramics is 40 or so, and Q value (1/dielectric loss) thereof indicates a range from several thousands to 15,000 or so, when measured at 9 GHz. While such dielectric ceramics exist in a comparatively large quantity, the ceramics materials having relative high dielectric constant are recognized to have a tendency to increase their dielectric loss, remarkably, and the current situation is such that those ceramics materials having their relative dielectric constant of 80 and indicating the Q value of 1,000 at the same measuring frequency, as mentioned above are available only in a very small quantity.

SUMMARY OF THE INVENTION

The present invention has been made with a view to solving such problems as previously mentioned, and aims at providing a dielectric ceramic for high frequency, which has relative dielectric constant of as high as 80 or above and a sufficiently high Q value of 1,000 or even in a microwave region.

That is to say, according to the general aspect of the present invention, there is provided a dielectric ceramic for high frequency having a structure of $Sr_3Ti_2O_7$, and being represented by the following general formula: $Sr_{3(1-x)}Ca_{3x}Ti_2O_7$ (where: $0.1 < x \leq 0.55$).

The foregoing object, other objects, as well as the specific construction and function of the dielectric ceramics for high frequency according to the present invention will become more apparent and understandable from the following detailed description of preferred examples.

DETAILED DESCRIPTION OF PREFERRED EMBODIMENT

The dielectric ceramics for high frequency according to the preferred embodiments of the present invention is obtained by blending, for example, strontium carbonate, calcium carbonate and titanium oxide at their predetermined ratio, and sintering the mixture, and can be represented by the general formula of $Sr_{3(1-x)}Ca_{3x}Ti_2O_7$ (where: $0.1 < x \leq 0.55$). While it is not easy to define primarily the limit quantity of the dielectric ceramics material, which varies to some extent depending on the conditions for its production, it can be said basically that, when the x value becomes equal to, or smaller than, 0.1 ($x \leq 0.1$) which is outside the above-mentioned compositional range, the relative dielectric constant of the ceramic material abruptly decreases, whereby it becomes difficult to attain the performance required of the ceramics material. Also, when the x value is greater than 0.55 ($x > 0.55$), the single phase structure of $Sr_3Ti_2O_7$ is destroyed. In this region where the multiphase structure begins to occur, the relative dielectric constant of the ceramics material increases, but its Q value decreases, which is lower than 1,000 at the frequency of 9 GHz with the consequence that it is no longer possible to satisfy the required characteristics.

To those persons who would readily practice the present invention, the following preferred examples are presented along with comparative examples of conventional dielectric ceramics materials.

Powders of strontium carbonate, calcium carbonate, and titanium oxide, all being available in general market, were weighed for the compositional ratios of the specimens as shown in the following Table 1 (specimens No. 1 to No. 8). The material powders were then charged into a ball mill pot made of Nylon, together with zirconia ball and methanol-denatured alcohol, and the batch was mixed for 16 hours. Thereafter, the mixed slurry was dried for three hours at a temperature of 100° C., followed by pulverizing the dried substance. Following this, the pulverized substance was calcined for three hours at a temperature of 1,000° C., thereby obtaining a compound powder. This compound was further pulverized in the ball mill under the same conditions as mentioned above, followed by drying the same. The thus obtained powder was then shaped into a cylindrical column of 10 mm in diameter and about 10 mm in height under a pressure of 700–800 kg/cm². This shaped body was then sintered in an oxygen or oxygen-containing atmosphere at a temperature ranging from 1,300° C. to 1,400° C. for three hours. As the result, the dielectric ceramics was obtained according to the preferred examples of the present invention and the comparative examples.

Each of the specimen ceramics obtained in the above-described manner was machined to a predetermined dimension, after which was measured for its dieletric characteristics (relative dielectric constant and Q value) at the frequency of 9 GHz by the dielectric resonator method. The results of measurements are shown in the following Table 1. As is apparent from the Table, the dielectric ceramics according to the preferred examples of the present invention possessed high relative dielectric constant of as high as 80 or above and a sufficiently high Q value (1/dielectric loss), even in the microwave region.

TABLE 1

| Specimen No. | x Value | Relative Dielectric Constant | Q Value (1/dielectric Loss) |
| --- | --- | --- | --- |
| 1 | 0.00 | 40 | 200 |
| 2 | 0.05 | 60 | 1000 |
| 3 | 0.10 | 80 | 1100 |
| 4 | 0.15 | 90 | 1200 |
| 5 | 0.25 | 107 | 1400 |
| 6 | 0.45 | 133 | 1250 |
| 7 | 0.55 | 142 | 1050 |
| 8 | 0.65 | 148 | 800 |

As has so far been described in the foregoing, the present invention is able to provide the dielectric ceramics for high frequencies having its dielectric constant of as high as 80 and sufficiently high Q value (1/dielectric loss) of 1,000 or above, even in the microwave region. This can be realized by the use of a compound having a structure of $Sr_3Ti_2O_7$, and being represented by a general formula of: $Sr_{3(1-x)}Ca_{3x}Ti_2O_7$ (where: $0.1 < x \leq 0.55$). As an example, the use of the dielectric ceramics for high frequency according to the present invention makes it possible to accelerate reduction in size and high performance of those application parts for microwaves such as dielectric resonators.

Although, the present invention has been described with particular reference to the preferred embodiments thereof, it should be understood that the invention is not limited to these embodiments alone, but any changes and modifications may be made in the compound used within the ambit of the present invention as recited in the appended claim.

What is claimed is:

1. A dielectric ceramic having a structure of $Sr_3Ti_2O_7$, and being represented by the following general formula: $Sr_{3(1-x)}Ca_{3x}Ti_2O_7$ where: $0.1 < x \leq 0.55$.

2. The dielectric ceramic according to claim 1, having a relative dielectric constant of at least 80 and a Q value of at least 1,000 in the micro-wave region.

* * * * *